United States Patent
Matsumoto et al.

(10) Patent No.: US 7,583,171 B2
(45) Date of Patent: Sep. 1, 2009

(54) MAGNETIC FIELD GENERATOR, PHOTOMAGNETIC INFORMATION STORING SYSTEM, AND PHOTOMAGNETIC INFORMATION STORING APPARATUS

(75) Inventors: Tsuyoshi Matsumoto, Kawasaki (JP); Tohru Fujimaki, Kawasaki (JP); Hiroyasu Yoshikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 717 days.

(21) Appl. No.: 11/082,173

(22) Filed: Mar. 16, 2005

(65) Prior Publication Data
US 2005/0157596 A1 Jul. 21, 2005

Related U.S. Application Data

(63) Continuation of application No. PCT/JP03/05337, filed on Apr. 25, 2003.

(51) Int. Cl.
*G11B 11/00* (2006.01)
*H01F 5/00* (2006.01)
*H01F 27/28* (2006.01)

(52) U.S. Cl. .................. 335/296; 335/300; 336/61; 336/200; 336/232; 369/13.22; 369/13.23

(58) Field of Classification Search ............. 369/13.02, 369/13.14–13.23; 335/300; 336/200, 232, 336/61
See application file for complete search history.

(56) References Cited

U.S. PATENT DOCUMENTS 6,584,045 B1 * 6/2003 Ishii et al. ............... 369/13.23

FOREIGN PATENT DOCUMENTS

| JP | 4-076844 | 3/1992 |
|---|---|---|
| JP | 10-255207 | 9/1998 |
| JP | 11-250402 | 9/1999 |
| JP | 2000-036141 | 2/2000 |
| JP | 2000-090403 | 3/2000 |
| JP | 2001-023260 | 1/2001 |
| JP | 2002-230860 | 8/2002 |
| JP | 2003-051144 | 2/2003 |
| JP | 2003-123373 | 4/2003 |

* cited by examiner

*Primary Examiner*—Ramon M Barrera
(74) *Attorney, Agent, or Firm*—Fujitsu Patent Center

(57) ABSTRACT

The present invention efficiently radiates heat generated by a coil while suppressing a decrease in the efficiency of generation of magnetic fields caused by an eddy current. The present invention includes a coil extending spirally in a plane and covered with a dielectric material, a magnetic substance provided parallel with the plane so as to overlap the coil, and a radiator extending in the plane so as to surround the coil and having projecting portions which project toward an outermost periphery of the coil and groove portions recessed in a direction opposite to that in which the projecting portions project, the projecting portions and the groove portions being alternately arranged, the radiator having a higher thermal conductivity than the magnetic substance.

5 Claims, 14 Drawing Sheets

MAGNETIC FIELD GENERATOR, PHOTOMAGNETIC INFORMATION STORING SYSTEM, AND PHOTOMAGNETIC INFORMATION STORING APPARATUS

This is a continuation of International Application No. PCT/JP03/05337, filed Apr. 25, 2003.

TECHNICAL FIELD

The present invention relates to a magnetic field generator that generates magnetic fields, a photomagnetic information storing apparatus that records and reproduces information on and from a photomagnetic storage medium on which at least information recording is carried out when the medium is irradiated with light and receives applied magnetic fields, and a photomagnetic information storing system composed of multiple photomagnetic information storing apparatuses integrated together.

BACKGROUND ART

Information recording media such as CDs, CD-ROMs, CD-Rs, DVDs, PDs, MOs, and MDs have hitherto been widely used as massive recording medium that store sound or image signals. In particular, much attention has been paid to photomagnetic recording media on which at least information recording is carried out when the media are irradiated with light and receive applied magnetic fields. This is because these media are high-density recording media that enable rewriting of information. Much effort has been made to research and develop these recording media in order to further increase the recording density. Further, photomagnetic recording apparatuses have also been researched and developed in order to enable information to be reproduced from or recorded on such photomagnetic information recording media at higher speed.

The conventional photomagnetic information recording apparatus employs a light modulating system that records information on a recording medium by light modulation in accordance with the information. However, with the increased recording density, there is a tendency to employ, instead of the conventional light modulating system, a magnetic modulating system that records information by modulation of magnetic fields in accordance with the information.

A photomagnetic information recording apparatus using the magnetic field modulating system concentrates laser light for recording to make the temperature of a recording film of a recording medium close to a Curie point. Then, in this state, the apparatus applies magnetic fields generated by a coil to the recording film to adjust the magnetizing direction of the recording film in accordance with the information. The apparatus thus records the information.

To use such a photomagnetic information recording apparatus using the magnetic field modulating system to record or reproduce massive data at high speed, it is desirable to have a front illumination type configuration in which an optical system that concentrates light on a recording medium and a coil that generates magnetic fields are arranged on the same side, as viewed from the recording medium. In this configuration, in general, the optical system is placed on one surface of a glass substrate, while a spiral magnetic coil is placed on the other surface. To use the magnetic field modulating system to record and reproduce at high speed, it is necessary to switch the direction of magnetic fields applied to the recording film at high frequency. The above configuration provides a small-sized low-inductance magnetic field coil that requires reduced power. It is thus possible to provide a magnetic field coil that can be driven at high speed.

FIG. 1 is a schematic diagram showing the structure of a common magnetic field generator of a front illumination type.

In a magnetic field generator 7 in FIG. 1, an optical lens 72 is placed on a top surface of a glass substrate 71. A dielectric layer 73 is provided on a bottom surface of the glass substrate 71 which is opposite the top surface. A lens 8 is provided above the magnetic field generator 7 to concentrate laser light L on the optical lens 72. The laser light L concentrated by the lens 8 is further concentrated by the optical lens 72, provided on the top surface of the glass substrate 71. The resulting laser light L passes through the glass substrate 71 and dielectric layer 73. A recording layer 91 of a magnetic recording medium 9 is then irradiated with the laser light L. A coil is placed in the dielectric layer 73. The coil extends spirally in a direction in which the dielectric layer 73 extends, so as to surround an area through which the laser light L passes. Such a magnetic field coil composed of a thin film can be produced using a semiconductor process.

When a current is passed through the coil, the coil generates heat. In general, the electric resistance of a substance increases with increasing temperature. Thus, if the heat generated by the coil is not efficiently radiated, the coil lapses into a vicious circle in which it consumes more power owing to its own heat generation, thus further increasing the quantity of heat. The dielectric layer, in which the coil is provided, does not have a high thermal conductivity. Accordingly, the heat generated by the coil is not readily radiated. As a result, the temperature of the coil may increase rapidly to damage the coil before it can generate magnetic fields of a predetermined intensity. It is therefore an important object to radiate the heat generated by the coil.

It is thus possible to place a metal such as copper which has a high thermal conductivity, around the periphery of the coil so that the heat generated by the coil can be transmitted through the coil to be radiated to the exterior.

FIG. 2 is a diagram showing how a metal having a high thermal conductivity is placed around the periphery of a coil. FIG. 3 is a diagram of the coil shown in FIG. 2 and through which a current is passed, as viewed from a photomagnetic recording medium.

In these figures, the same components as those described above will be denoted by the same reference numerals. A coil 74, a yoke 75, and a radiator 76 are arranged inside the dielectric layer 73, provided in the glass substrate 71 shown in FIG. 2, the dielectric layer 73 made of alumina. The coil 74 extends spirally so as to surround an area through which the laser light L passes. The radiator 76 is a nonmagnetic metal film that extends so as to surround the periphery of the coil 74. The yoke 75 is a magnetic film that extends between the coil 74 and the glass substrate 71 so as to cover the coil 74 and a part of the radiator 75 which is closer to the coil 74. The yoke 75 functions as a core of the coil and also as a radiation path for heat generated by the coil 74 because it has a higher thermal conductivity than the dielectric layer 73. The heat generated by the coil 74, shown in FIG. 2, passes through the yoke 75 and is then radiated to the exterior from the radiator 76.

When a high-frequency current is passed through the coil 74, as the current flowing through the coil increases, an induced current (eddy current) (see arrow $I_e$ in FIG. 3) flows through the radiator 76, which is a conductor, the induced current flowing in a direction opposite to that of the current flowing through the coil 74 (see arrow I in FIG. 3). This may disadvantageously weaken magnetic fields generated by the coil 74.

To radiate the heat generated by the coil while solving the above problem, it is possible to employ a technique for distributively arranging small copper pieces so that the pieces surround the periphery of the coil 74 (see, for example, Patent Documents 1 and 2. However, since each of the copper pieces is very small, a high radiation efficiency is not expected. Accordingly, the techniques described in these patent documents cannot efficiently radiate the heat generated by the coil.

(Patent Document 1)
Japanese Patent Laid-Open No. 10-255207
(Patent Document 2)
Japanese Patent Laid-Open No. 11-316901

DISCLOSURE OF THE INVENTION

In view of the above circumstances, it is an object of the present invention to provide a magnetic field generator that can efficiently radiate heat generated by a coil, while suppressing a decrease in the efficiency of generation of magnetic fields caused by an eddy current, as well as a photomagnetic storing apparatus comprising the magnetic field generator, and a photomagnetic information storing system that includes the photomagnetic storing apparatuses plurally.

To accomplish this object, the present invention provides a magnetic field generator including, a coil extending spirally in a plane and covered with a dielectric material, a magnetic substance provided parallel with the plane so as to overlap the coil, and a radiator extending in the plane so as to surround the coil and having projecting portions which project toward an outermost periphery of the coil and groove portions which are recessed in a direction opposite to the direction in which the projecting portions project, the projecting portions and the groove portions being alternately arranged, the radiator having a higher thermal conductivity than the magnetic substance.

With the magnetic field generator according to the present invention, the closer the tips of the projecting portions are to the coil, the more magnetic flux passes through each of the projecting portions. Consequently, an increased amount of eddy current flows. However, the groove portions are farther from the coil than the projecting portions, so that a smaller amount of eddy current flows through the groove portions than through the projecting portions. Thus, in connection with the total amount of eddy current flowing through the radiator, a decrease in the efficiency of generation of magnetic fields can be limited to within an acceptable range. Further, the closer the tips of the projecting portions are to the coil, the more easily heat generated by the coil can be radiated. Moreover, the radiator extends so as to surround the coil. Accordingly, the radiator has a larger area than the spiral pattern of the coil. The radiator can thus produce a sufficient radiation effect.

Further, in a preferred aspect of the magnetic field generator according to the present invention, the magnetic substance extends parallel with the plane to a corresponding position between the projecting portions while avoiding overlapping the projecting portions. For example:

the coil extends spirally so as to surround a predetermined area of the plane, and the magnetic substance has multiple strips extending radially around an area overlapping the predetermined area.

The magnetic substance has a function for concentrating a magnetic flux generated around a current flowing through the coil, at itself. The magnetic flux generated is concentrated on the magnetic substance extending to the position corresponding to the area between the projections. A reduced amount of magnetic flux thus passes through the projecting portions. Thus, even when the tips of the projecting portions are located closer to the coil in order to improve the radiation efficiency, the amount of eddy current that flows through the projecting portions is reduced. Therefore, a decrease in the efficiency of generation of magnetic fields is suppressed.

Moreover, in the above aspect taken by way of example, the generator more preferably has non-magnetic substances each installed between the adjacent strips and extending so as to overlap the projecting portions and coil, the non-magnetic substances having a higher thermal conductivity than the dielectric material.

Since the magnetic substance has a higher thermal conductivity than the dielectric material, which covers the coil, it functions as a radiation path for heat generated by the coil. However, when the magnetic substance has multiple strips, the area of the radiation path is reduced. This lowers the efficiency of radiation utilizing the magnetic substance. Thus, the non-magnetic substances are installed to provide a radiation path for the heat generated by the coil. This further improves the radiation efficiency. In this case, a magnetic flux generated by the coil does not concentrate on the non-magnetic substances. Thus, only a small amount of eddy current is generated even in a part of the non-magnetic substance which overlaps the coil, compared to the magnetic substance.

According to another preferred aspect, the magnetic field generator according to the present invention has magnetic members installed in recesses of the groove portions and covered with a dielectric material, the magnetic members having a higher volume resistivity than the radiator.

According to this aspect, the magnetic member installed in the recess of the groove portion, that is, the magnetic member installed in a plane in which the radiator extends, attracts a magnetic flux generated around a current flowing through the coil. Consequently, a reduced amount of magnetic flux flows through the projecting portions. This makes it possible to arrange the tips of the projecting portions closer to the coil. The radiation efficiency can thus be improved. Further, an eddy current is likely to be generated in this magnetic member. However, since the amount of eddy current decreases in inverse proportion to the volume resistivity in accordance with the Ohm's law (the amount of eddy current=induced electromotive force/resistance value) and the magnetic member has a higher volume resistivity than the radiator, the amount of eddy current generated in the magnetic member is smaller than that generated in the projecting portions in the absence of this magnetic member. This serves to suppress a decrease in the efficiency of generation of magnetic fields. It is also possible to reduce the quantity of heat generated as a result of the eddy current.

Moreover, in the magnetic field generator according to the present invention, each of the projecting portions preferably has a width decreasing toward an outermost periphery of the coil.

This makes it possible to reduce the amount of eddy current generated in the projecting portion.

To accomplish the above object, the present invention provides a photomagnetic information storing system that has multiple photomagnetic information storing apparatuses each including a medium storing section which stores multiple disk-like photomagnetic storing media on and from which information can be recorded and reproduced and on which at least information recording is carried out when the media are irradiated with light and receive applied magnetic fields, a recording and reproducing section which records and/or reproduces information on and from each of the photomagnetic storage media, a medium moving section which moves the photomagnetic storage medium between the medium storing section and the recording and reproducing section, and a blade housing which integrally holds the medium storing section, the medium moving section, and the recording and reproducing section, a system housing in which the multiple photomagnetic information storing apparatuses are mounted and which detachably holds the multiple photomagnetic information storing apparatuses, and a control section which controls recording and/or reproduction of information in each of the multiple photomagnetic information storing apparatuses mounted in the system housing, and in that:

the recording and reproducing section has:

a magnetic field generator having a coil extending spirally in a plane and covered with a dielectric material, a magnetic substance provided parallel with the plane so as to overlap the coil, and a radiator extending in the plane so as to surround the coil and having projecting portions which project to an outermost periphery of the coil and groove portions which are recessed in a direction opposite to the direction in which the projecting portions project, the projecting portions and the groove portions being alternately arranged, the radiator having a higher thermal conductivity than the magnetic substance, and a light source which emits light, and in that:

information is recorded on the photomagnetic storage medium by applying magnetic fields generated by the magnetic field generator to the photomagnetic storage medium and irradiating the photomagnetic storage medium with light emitted by the light source.

To accomplish the above object, the present invention provides a photomagnetic information storing apparatus which records and/or reproduces information on and from a disk-like photomagnetic storage medium on and from which information can be recorded and reproduced and on which at least information recording is carried out when the medium is irradiated with light and receives applied magnetic fields, the photomagnetic information storing apparatus including:

a medium storing section which plurally stores the photomagnetic storing medium, a recording and reproducing section which records and/or reproduces information on and from the photomagnetic storage medium, a medium moving section which moves the photomagnetic storage medium between the medium storing section and the recording and reproducing section, a blade housing in which the medium storing section, the medium moving section, and the recording and reproducing section are arranged in a line and which integrally holds the medium storing section, the medium moving section, and the recording and reproducing section, and a connecting section which detachably connects the information storing apparatus to a system housing in which the information storing apparatus is plurally mounted, and in that:

the recording and reproducing section has:

a magnetic field generator having a coil extending spirally in a plane and covered with a dielectric material, a magnetic substance provided parallel with the plane so as to overlap the coil, and a radiator extending in the plane so as to surround the coil and having projecting portions which project to an outermost periphery of the coil and groove portions which are recessed in a direction opposite to the direction in which the projecting portions project, the projecting portions and the groove portions being alternately arranged, the radiator having a higher thermal conductivity than the magnetic substance, and a light source which emits light, and in that:

information is recorded on the photomagnetic storage medium by applying magnetic fields generated by the magnetic field generator to the photomagnetic storage medium and irradiating the photomagnetic storage medium with light emitted by the light source.

For either the photomagnetic information storing system or photomagnetic information storing apparatus according to the present invention, only its basic form is described above. However, this is simply to avoid duplication. The photomagnetic information storing system and photomagnetic information storing apparatus according to the present invention includes not only the basic form but also various aspects corresponding to those of the above magnetic field generator.

As described above, the present invention provides a magnetic field generator that can efficiently radiate heat generated by the coil, while suppressing a decrease in the efficiency of generation of magnetic fields caused by an eddy current, as well as a photomagnetic storing apparatus comprising the magnetic field generator, and a photomagnetic information storing system including the photomagnetic storing apparatus plurally.

BEST MODE FOR CARRYING OUT THE INVENTION

Embodiments of the present invention will be described below. In the description below, "information" may not be distinguished from "data".

Figure 4:
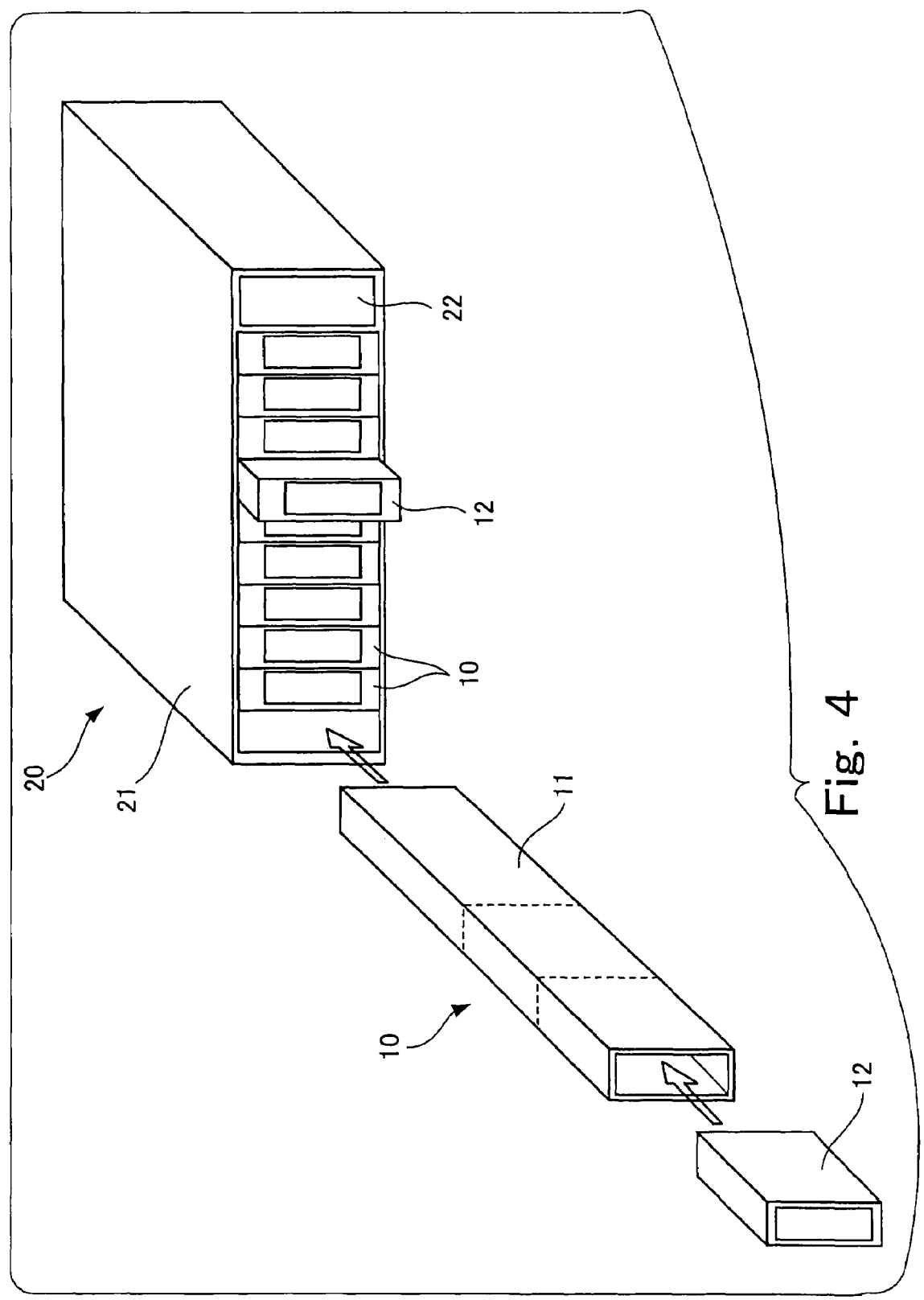
FIG. 4 is a diagram showing the appearance of embodiments of an optical information storing system and an optical information storing apparatus according to the present invention.

FIG. 4 is a diagram showing the appearance of embodiments of an optical information storing system and an optical information storing apparatus according to the present invention.

FIG. 4 shows a blade apparatus 10 which corresponds to an embodiment of the optical information storing apparatus and which uses, by way of example, a magneto-optical (MO) disk as an optical storing medium according to the present invention. FIG. 4 also shows a collective system 20 which corresponds to an embodiment of the optical information storing system according to the present invention and into which multiple (in this figure, 10) blade apparatuses 10 are incorporated.

A housing 11 of the blade apparatus 10 has a length three or more times as large as the diameter of the MO disk, a width (in this figure, height) slightly larger than the diameter of the MO disk, and a thickness (in this figure, width) significantly smaller than the diameter of the MO disk. A magazine 12 in which multiple MO disks are stored is detachably placed at one end of the housing 11.

Multiple blade apparatuses 10 are releasably mounted in a housing 21 of the collective system 20. The magazine 12 of each of the blade apparatuses 10 is detachable even after the blade apparatus 10 has been inserted into the housing 21 of the collective system 20. Further, the collective system 20 is provided with a control device 22 that controls recording and reproduction of information in each of the plurality of blade apparatuses 10.

In the collective system 20, multiple blade apparatuses 10 are compactly housed in the housing 21. Thus, a compact and massive storage system is provided. Further, the capacity can be easily increased by increasing the number of MO disks or blade apparatuses 10. Maintenance can also be easily carried out by removing and replacing the magazine 12 or blade apparatus 10 with a new one.

Figure 5:
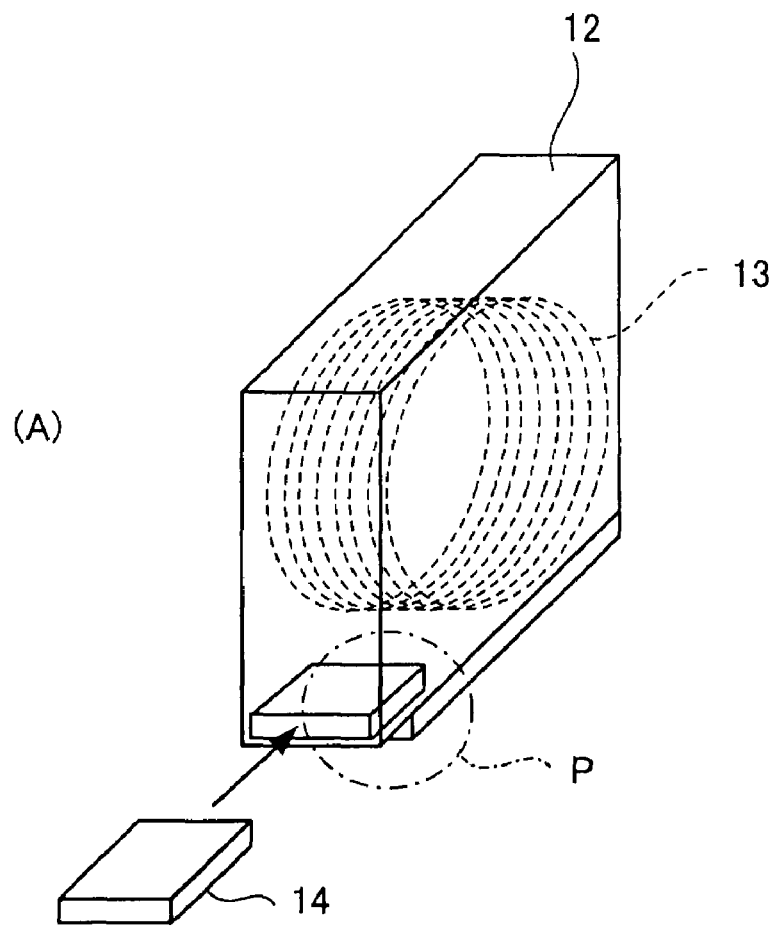
FIG. 5 is a diagram showing a magazine in detail.
Figure 5:
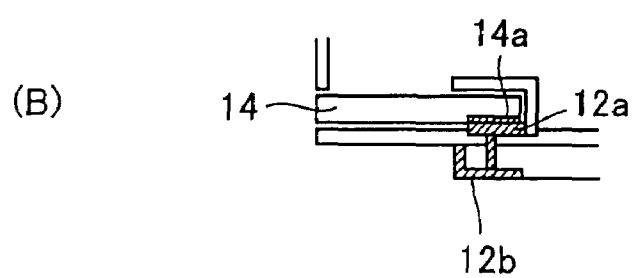

FIG. 5 is a diagram showing the magazine in detail.

Part (A) of FIG. 5 is a perspective view showing how multiple MO disks 13 are housed in the magazine 12. Part (B) of FIG. 5 is an enlarged sectional view of a range P enclosed by an alternate long and short dash line.

A detachable FRAM 14 is inserted into the magazine 12. A terminal 14a of the FRAM 14 contacts with an internal terminal 12a provided in the magazine 12. The terminal 14a is electrically connected to an external terminal 12b joined to the internal terminal 12a. When the magazine 12 is installed in the blade apparatus 10, shown in FIG. 4, the external terminal 12b is electrically connected to internal wiring in the blade apparatus 10. This enables the blade apparatus 10 to write or read data to or from the FRAM 14.

Information such as the position at which each MO disk 13 is stored in the magazine 12 is recorded in the FRAM 14.

The present embodiment uses MO disks 13 of a type in which information can be recorded on both front and back surfaces. A recording film is provided on both front and back surfaces of the MO disk 13. The recording film on each of the front and back surfaces is irradiated with light and receives applied magnetic fields to record and reproduce information, as described later. Each of the blade apparatuses 10 shown in FIG. 4 is configured so that it can simultaneously access the front and back surfaces of the MO disk 13.

Figure 6:
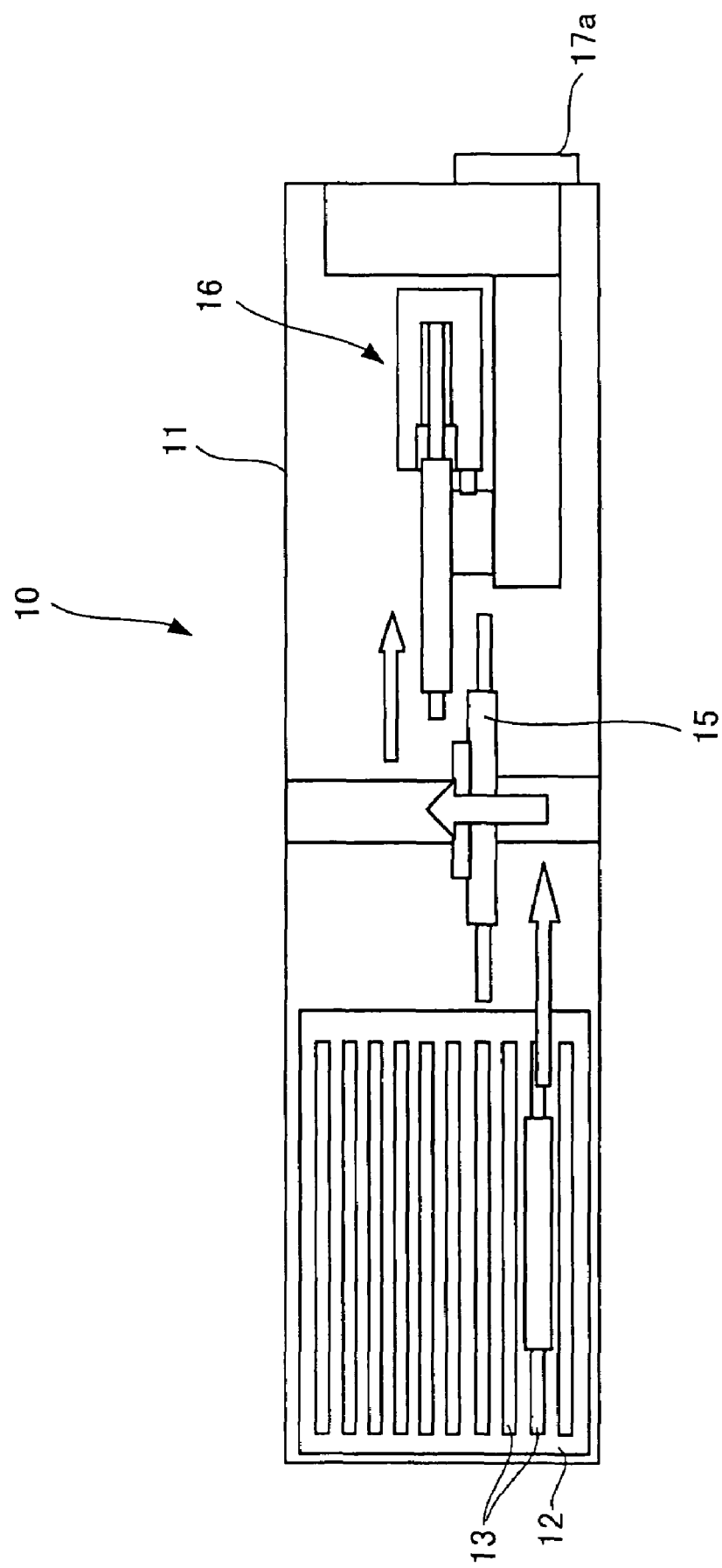
FIG. 6 is a diagram showing the hardware structure of a blade apparatus.

FIG. 6 is a diagram illustrating the hardware structure of the blade apparatus.

The blade apparatus 10 shown in FIG. 4 has the above magazine 12 and a drive 16 in the housing 11; the drive 16 records and reproduces information on and from the MO disk 13. A changer 15 is installed between the magazine 12 and the drive 16 to move the MO disk 13 between them. The drive 16 corresponds to an example of a recording and reproducing section according to the present invention. The changer 15 corresponds to an example of a medium moving section according to the present invention.

Thus, in the blade apparatus 10, the magazine 12, the changer 15, and the drive 16 are compactly housed in the housing 11. Provided that there is a space in the magazine, the storage capacity can be increased by increasing the number of MO disks 13. Further, maintenance can be carried out easily by removing or replacing the magazine 12 or the MO disk 13.

A connector 17a for an interface is provided at an end of the blade apparatus 10 which is opposite the magazine 12; the interface transfers data between the blade apparatus 10 and an external apparatus. When the blade apparatus 10 is inserted into the housing 21 of the collective system 20, shown in FIG. 4, the connector 17a is joined to a connector in the collective system 20. The connector 17a corresponds to an example of a connecting section according to the present invention.

The changer 15 has a function for inserting and removing the MO disk 13 into and from the magazine 12, a function for moving the MO disk 13 in the vertical direction of the figure, and a function for setting and removing the MO disk 13 in and from the drive 16.

As described in FIG. 4, the housing 11 according to the present embodiment is three or more times as long as the MO disk 13. The changer 15 and the drive 16 can be arranged so that the MO disk 13 on the changer 15 and the MO disks 13 installed in the drive 16 overlap each other. The length of the blade housing according to the present invention is preferably 2.5 or more times as large as the diameter of the optical storing medium.

Figure 7:
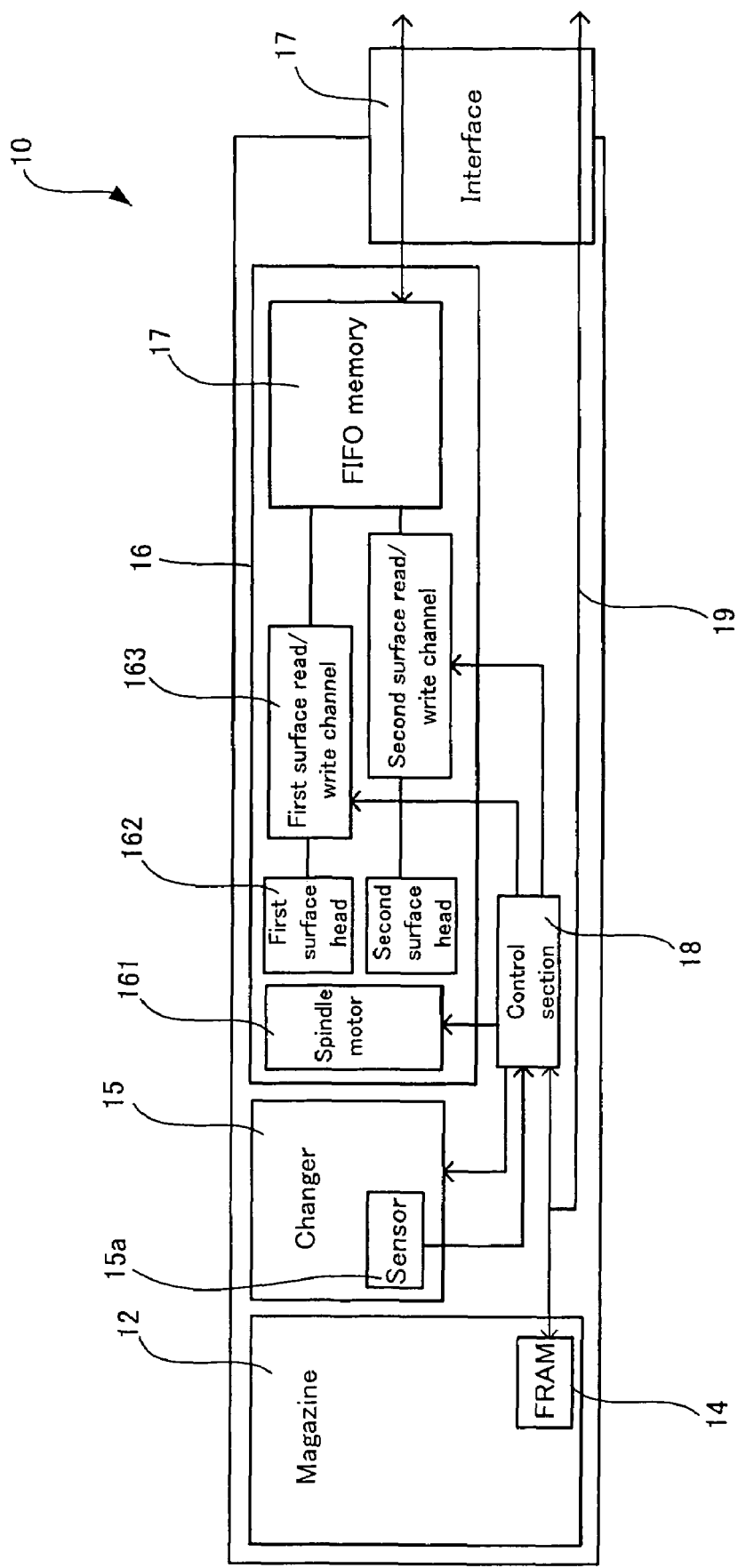
FIG. 7 is a functional block diagram illustrating the functional structure of the blade apparatus.

FIG. 7 is a functional block diagram illustrating the functional structure of the blade apparatus.

As described above, the blade apparatus 10 has the magazine 12, the changer 15, and the drive 16. The blade apparatus 10 further has a control section 18 that controls the changer 15 and the drive 16, and the interface 17 that transfers data between the blade apparatus and an external apparatus. The interface 17 is selected from well-known high-speed serial-type interfaces such as IEEE 1394, USB, and serial ATA. The detailed description of the interface 17 is omitted.

The drive 16 is provided with a spindle motor 161 that holds and rotates the MO disk and a head 162 that irradiates the MO disk with light and to record or reproduce information on and from the MO disk. The head 162 is provided for each of a first and second surfaces (front and back surfaces) of the MO disk. Further, the drive 16 is provided with a read/write channel 163 and a first-in first-out (FIFO) memory 164 for each of the front and second surfaces; the first-in first-out (FIFO) memory 164 functions as a buffer.

An external apparatus inputs specification information for specifying a MO disk to the control section 18 via the interface 17 through a path not shown in the figures. After the specification information has been input, the control section 18 finds the specified one of the multiple MO disks stored in the magazine 12, on the basis of the specification information. The control section 18 instructs the changer 15 to remove the MO disk found from the magazine 12 and set it in the drive 16. The changer 15 removes the MO disk specified by the control section 18 from the magazine 12 and sets it in the drive 16.

That is, since the control section 18 can find the MO disk to be accessed, on the basis of information stored in the FRAM 14, an access can be promptly started even when for example, the magazine 12 has been replaced with a new one.

The blade apparatus 10 is provided with an access path 19 used by an external apparatus to directly access the FRAM 14 without passing through the control section 18. Even if the blade apparatus 10 has been powered off, the information stored in the FRAM 14 can be externally checked via the access path 19.

Figure 8:
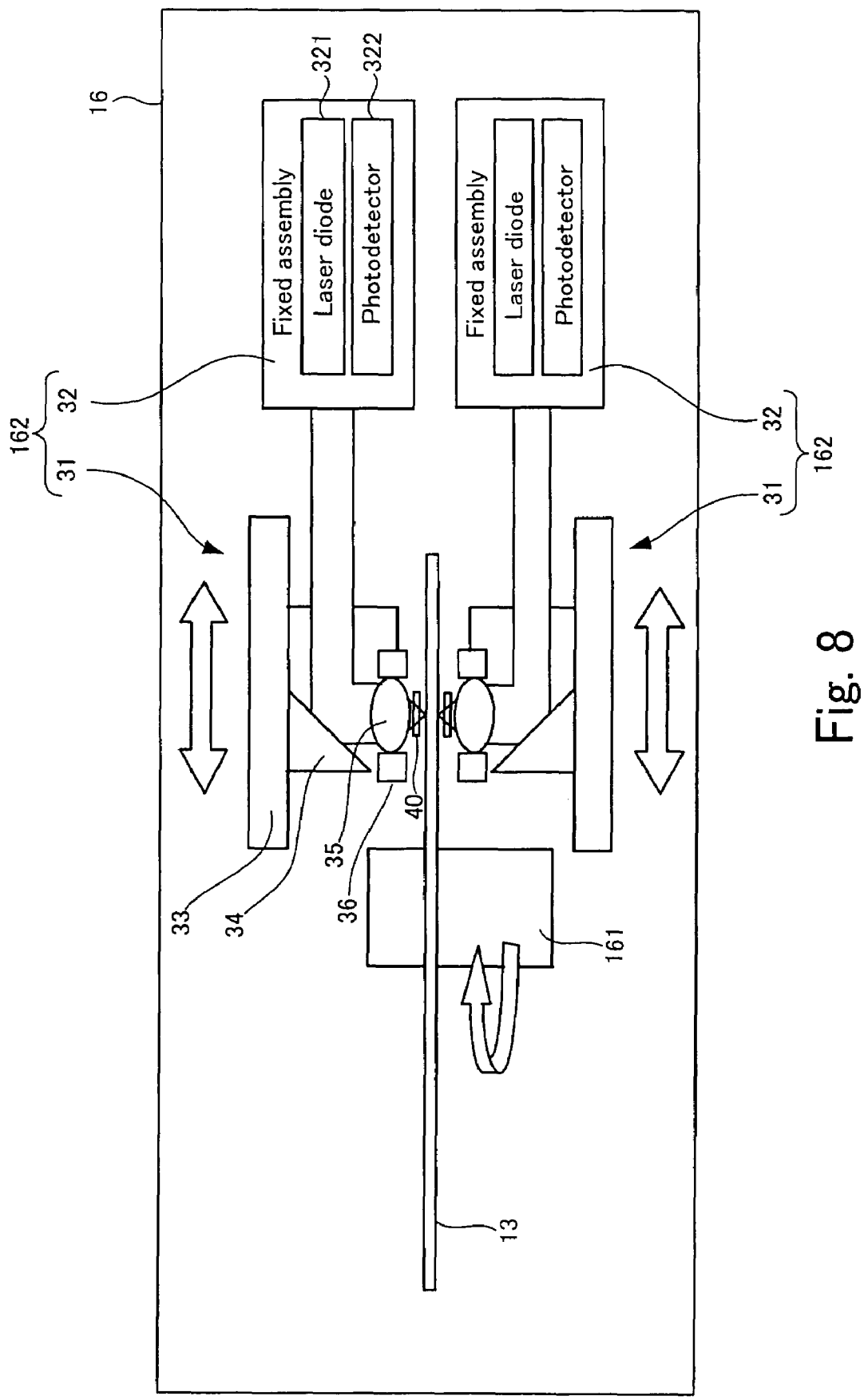
FIG. 8 is a diagram showing the structure of vicinity of a head of a drive.

FIG. 8 is a diagram illustrating the structure of vicinity of the head of the drive.

The drive 16 is provided with two heads 162. FIG. 8 shows the structure of vicinity of the two heads 162. The two heads 162 are arranged so as to sandwich, between themselves, the MO disk 13 held and rotated by the spindle motor 161. Each of the heads 162 is composed of a fixed assembly 32 fixed to a drive base (not shown) and a movable assembly (carriage 31 that is movable in a radial direction of the MO disk.

The fixed assembly 32 contains a laser diode 321 which is an example of a light source according to the present invention and which generates laser light used to write or read information, a photodetector 322 that detects a signal contained in reflected light from the MO disk 13 and corresponding to information stored in the MO disk 13, and various optical elements.

The movable assembly 31 has a function for irradiating a desired position of the MO disk 13 with laser light while applying magnetic fields to the MO disk 13 by moving in the radial direction of the MO disk 13, and then returning light reflected by the MO disk 13 to the fixed assembly 32. The movable assembly 31 has a carriage base 33, a rising mirror 34 that reflects laser light, a magnetic field generator 40 comprising a coil, a condenser lens 35 that concentrates laser light on the magnetic field generator 40, and a lens actuator 36 that moves the condenser lens 35.

Figure 9:
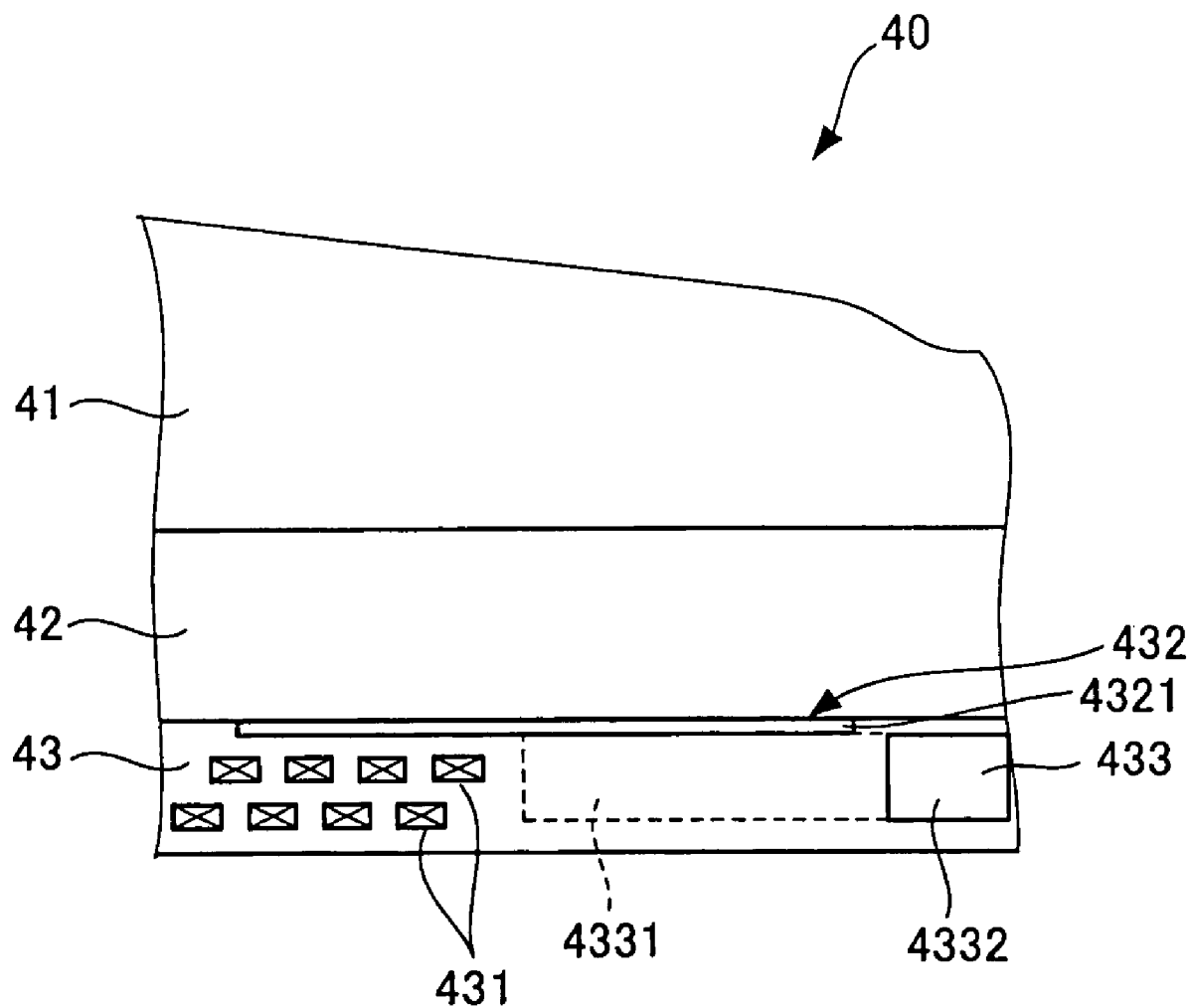
FIG. 9 is a sectional view schematically showing a part of the structure of a magnetic field generator shown in FIG. 8.
Figure 10:
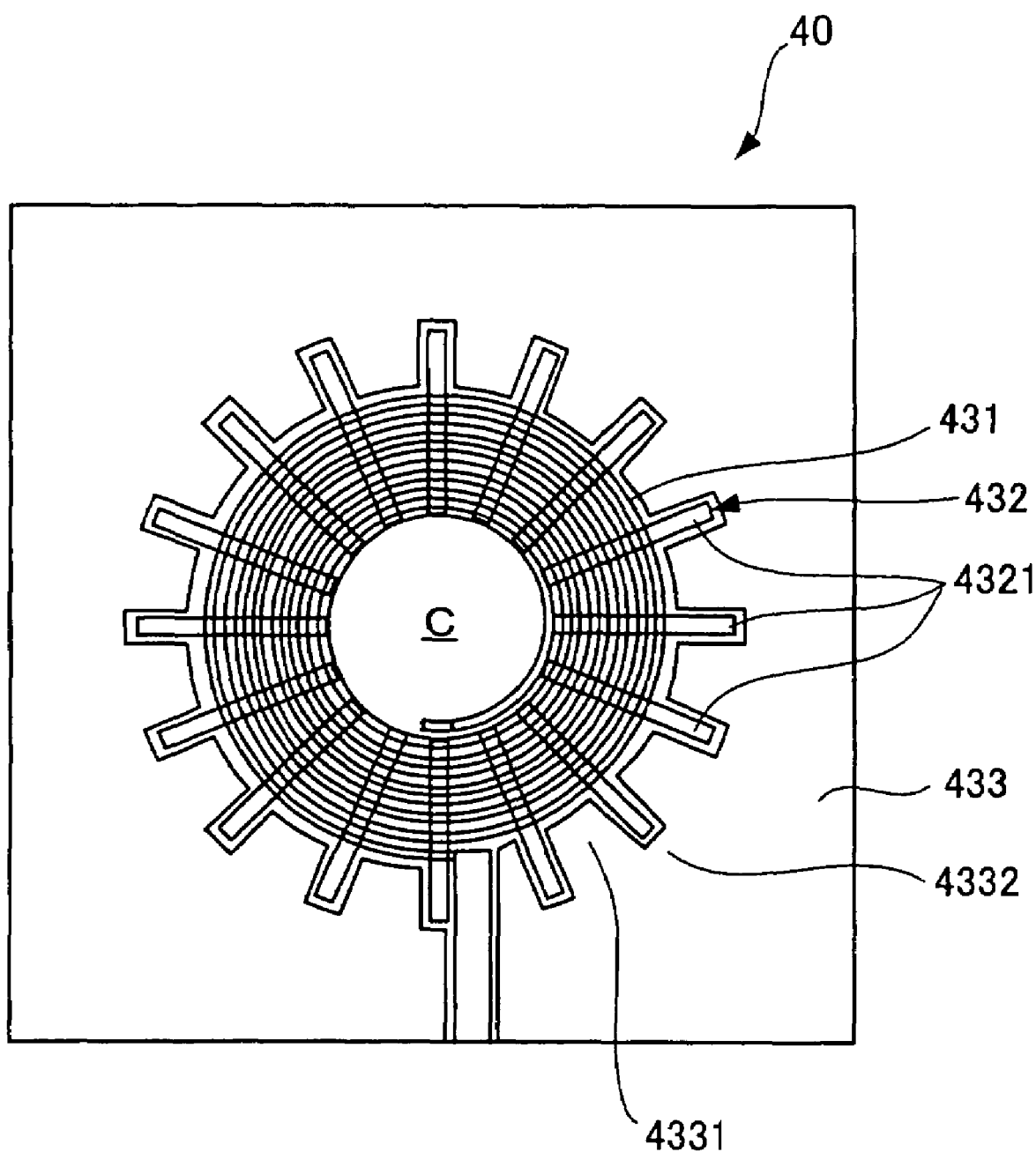
FIG. 10 is a schematic diagram showing the internal structure of a dielectric layer and in which a magnetic field generator is viewed from a MO disk.

FIG. 9 is a sectional view schematically showing the structure of a part of the magnetic field generator shown in FIG. 8. FIG. 10 is a schematic diagram showing the internal structure of a dielectric layer and in which the magnetic field generator is viewed from the MO disk.

The magnetic field generator 40 shown in FIG. 9 has a glass substrate 42 having an optical lens 41 on one surface. A dielectric layer 43 is formed on a surface of the glass substrate 42 which is opposite the surface on which the optical lens 41 is installed. The magnetic field generator 40 is installed on the movable assembly 31 so that the optical lens 41 faces the condenser lens 35, while the dielectric layer 43 faces the MO disks 13 set in the drive 16. Laser light concentrated by the condenser lens 35 is further concentrated by the optical lens 41, provided on the glass substrate 42. The resulting light passes through the glass substrate 42 and the dielectric layer 43. The MO disk 13 is then irradiated with the light.

Figure 1:
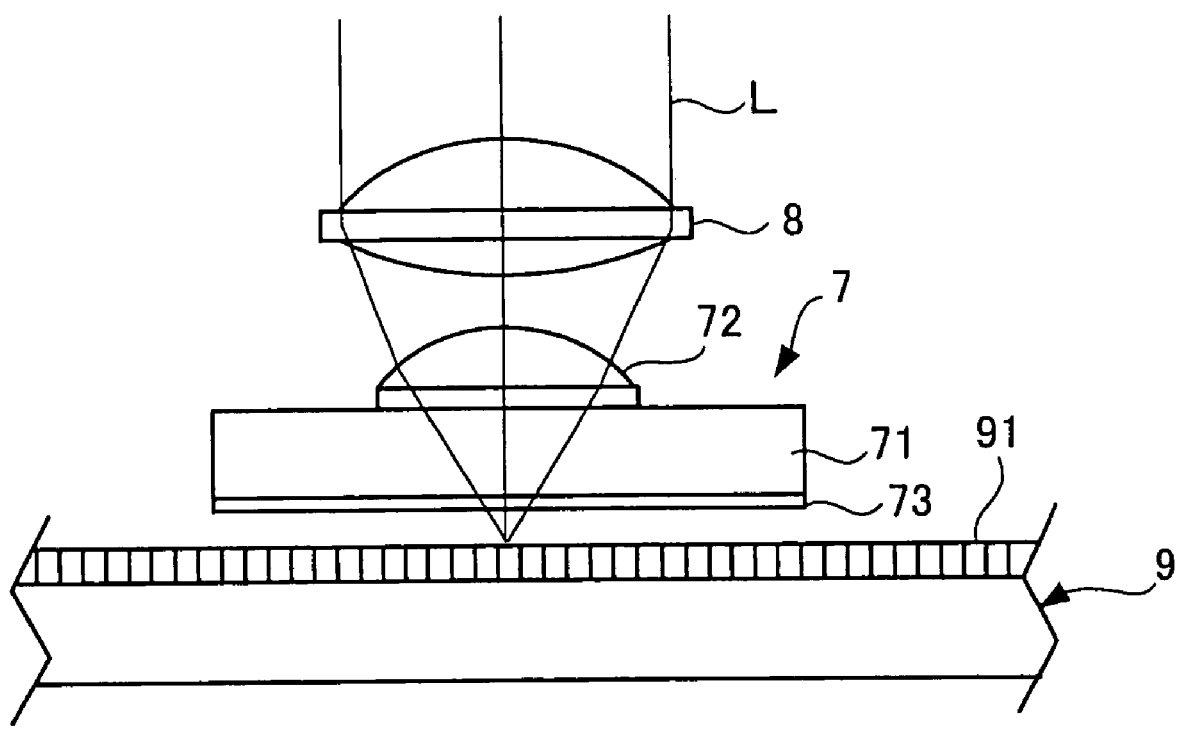
FIG. 1 is a schematic diagram showing the structure of a common magnetic field generator of a front illumination type.
Figure 2:
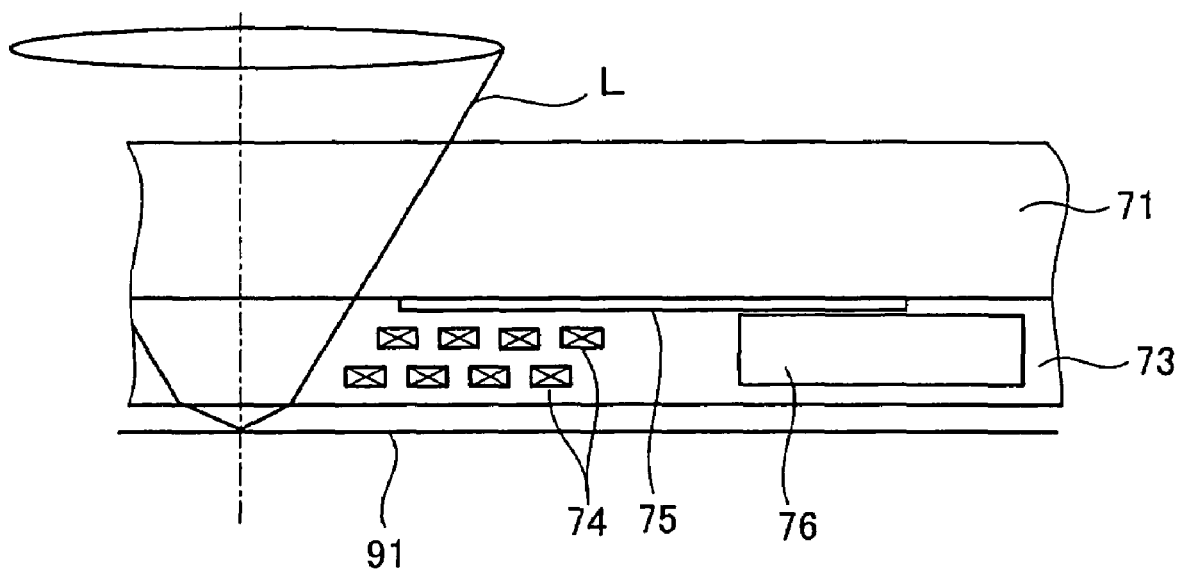
FIG. 2 is a diagram showing how a metal having a high thermal conductivity is placed around the periphery of a coil.
Figure 3:
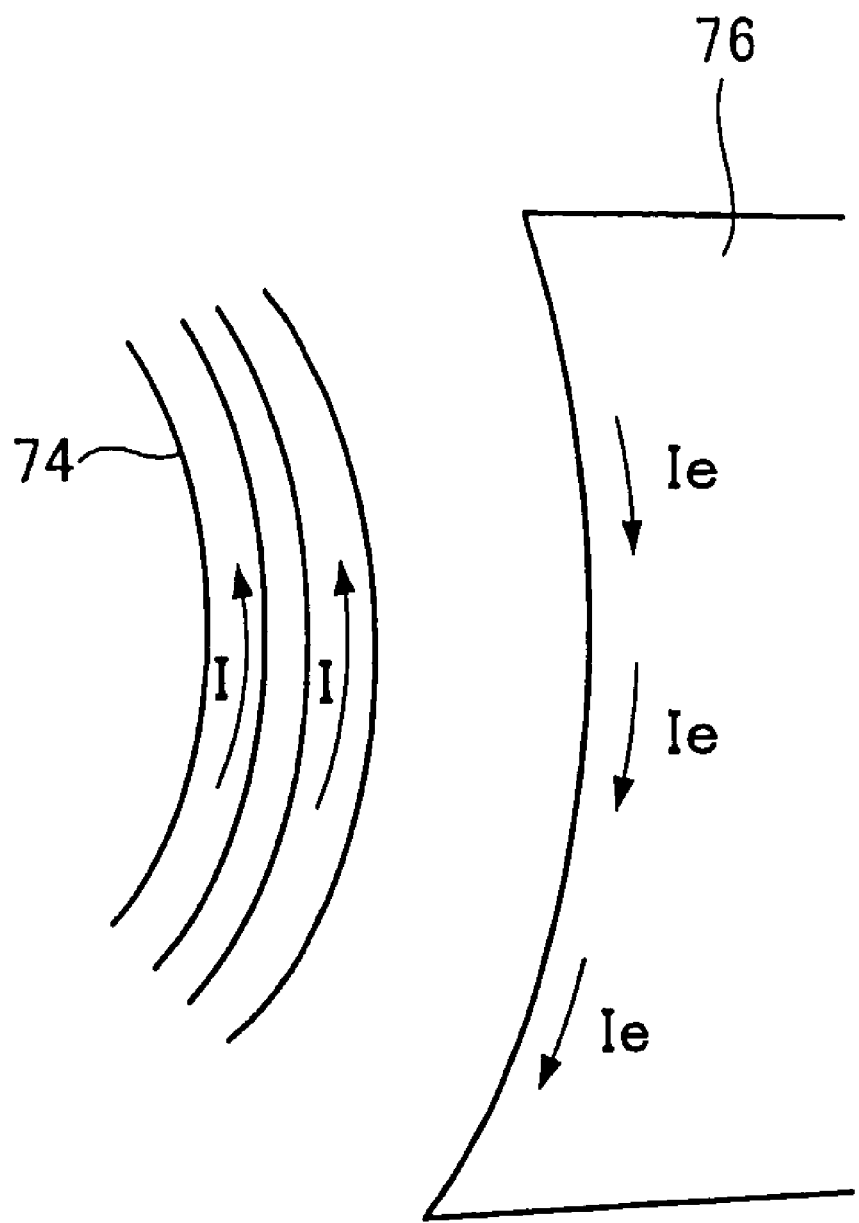
FIG. 3 is a diagram of the coil shown in FIG. 2 and through which a current is passed, as viewed from a photomagnetic storage medium.

The dielectric layer 43 shown in FIG. 9 is made of alumina, having a relatively high thermal conductivity. The thermal conductivity is about 20 W/mK. A coil 431, a yoke 432, and a radiator 433 are installed inside the dielectric layer 43. As shown in FIG. 10, the coil 431 extends spirally in a direction in which the dielectric layer 43 extends, so as to surround a transmission area C through which laser light passes. As shown in FIG. 9, the coil 431 is composed of two parts provided at respective levels in the vertical direction. In the spiral coil 431 composed of the two parts provided at the respective levels in the vertical direction, the upper part and lower part are connected together at an end of its innermost periphery that surrounds the transmission area C. The yoke 432 is installed between the coil 431 and the glass substrate 42 so as to overlap the coil 431. The yoke 432 has multiple strips 4321 extending radially around the transmission area C as shown in FIG. 10. The yoke 432 is a soft magnetic substance such as a permalloy or a CoNiFe alloy. The soft magnetic substance has a higher thermal conductivity than alumina, constituting the dielectric layer 43. Accordingly, each of the strips 432 concentrates a magnetic flux generated around a current flowing through the coil 431, at itself. The strip 432 also functions as a radiation path for heat generated by the coil 431. The radiator 433 is a metal film of copper which extends in the same plane in which the coil 431 is provided, so as to surround the coil 431. The radiator 433 has a much larger area than the spiral pattern of the coil 431. Further, copper has a thermal conductivity of about 400 W/mK, which is 20 times as high as that of alumina and is higher than that of the yoke 432, which is a permalloy or CoNiFe alloy. Therefore, the radiator 433 has a sufficient radiation effect. The radiator 433 is not limited to the metal film of copper but has only to have a higher thermal conductivity than the yoke 432. The radiator 433 has projecting portions 4331 projecting toward the outermost periphery of the coil 431 and groove portions 4332 recessed in a direction opposite to that in which the projecting portions 4331 project, the projecting portions 4331 and the groove portions 4332 being alternately arranged. As shown in FIG. 9, the radiator 433 is installed in a plane different from the one in which the yoke 432 is provided. As shown in FIG. 10, each of the multiple strips 4321, constituting the yoke 432, avoids overlapping the projecting portions 4331, and extends to the recess of the corresponding groove portion 4332, that is, a corresponding position between the adjacent projecting portions 4331. In the present embodiment, heat generated by the upper part of the coil 431 is transmitted to the radiator 433 via the strips 4321 or directly to the projecting portions 4331 of the radiator 433. In either way, the radiator 433 radiates the heat. Further, heat generated by the lower part of the coil 431 is mainly transmitted to the projecting portions 4331 of the radiator 433. The radiator 433 then radiates the heat. According to the experiments, when a driving frequency of 30 MHz was used to cause the coil to generate magnetic fields of 200 [Oe], the temperature of the coil increased by 90° C. with a magnetic field generator of the conventional structure shown in FIG. 2. However, with a magnetic field generator in which the projecting portions 4331 of the radiator 433 were located closer to the outermost periphery of the coil 431, that is, 7 to 10 μm from the outermost periphery and in which the ratio of the width of the projecting portion 4331 (the circumferential length of the coil 431) to the width of the recess of the groove portion was 1 to 1, the rise in the temperature of the coil was reduced to about 65° C. This indicates that the latter magnetic field generator efficiently radiates the heat generated by the coil.

Further, the magnetic flux that is generated around the current flowing through the coil 431 by passing a current through the coil 431 is concentrated on each strip 4321 that extends to the position corresponding to the recess of the groove portion 4332, and thus the amount of the magnetic flux passing through the projection portion 4331 decreases.

In this case, the projecting portion 4331 preferably has a width decreasing toward the coil 431.

Figure 11:
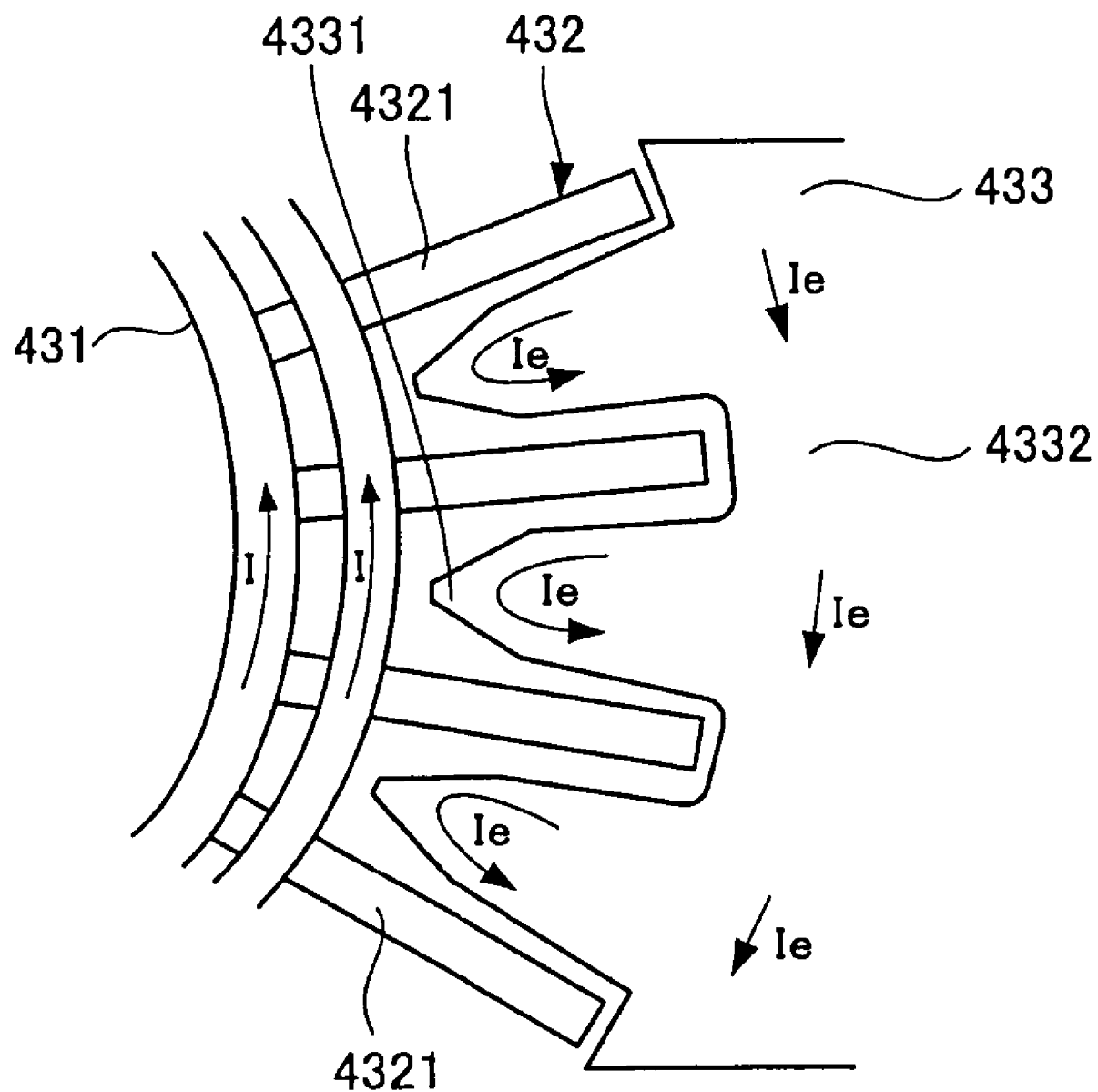
FIG. 11 is a diagram of a coil surrounded by a radiator having projecting portions each having a width decreasing toward the coil and through which a current is passed, as viewed from the MO disk.

FIG. 11 is a diagram of the coil which is surrounded by the radiator having the projecting portions having a width decreasing toward the coil and through which a current is passed, as viewed from the MO disk.

The same components as those described above will be denoted by the same reference numerals. In the description given hereinafter, the same components are also denoted by the same reference numerals. The radiator 433 is a metal film of copper and is thus a conductor. Accordingly, when a current is passed through the coil 431, an induced current (eddy current) (see arrow Ie in FIG. 11) flows through the radiator 433; the induced current flows in a direction opposite to that of a current flowing though the coil 431 (see arrow I in FIG. 11). The intensity of magnetic fields generated by a current is in inverse proportion to the square of the distance. The impact of magnetic fields is weaker at a longer distance and is stronger at a shorter distance. When each projecting portion 4331 has a width decreasing toward the coil 431 as shown in FIG. 11, it is possible to further reduce the amount of magnetic flux passing through the projecting portion 4331. This further reduces the amount of eddy current flowing through the projecting portion 4331. Furthermore, since the groove portion 4332 is farther from the coil 431 than the projecting portion 4331, the eddy current flowing through the groove portion 4332 is much less than that flowing through the projecting portion 4331. In view of the total amount of eddy current flowing through the radiator 433, a decrease in the efficiency of generation of magnetic fields is limited to a sufficiently acceptable range.

Further, each of the plurality of strips 4321 constituting the yoke 432 is relatively narrow because it avoids overlapping the projecting portions 4331 in order to reduce the amount of magnetic flux passing through them. Thus, if the function of the radiation path may be degraded as a result of a decrease in the area of the yoke 432, a heat transfer member is preferably installed between the adjacent strips 4321.

Figure 12:
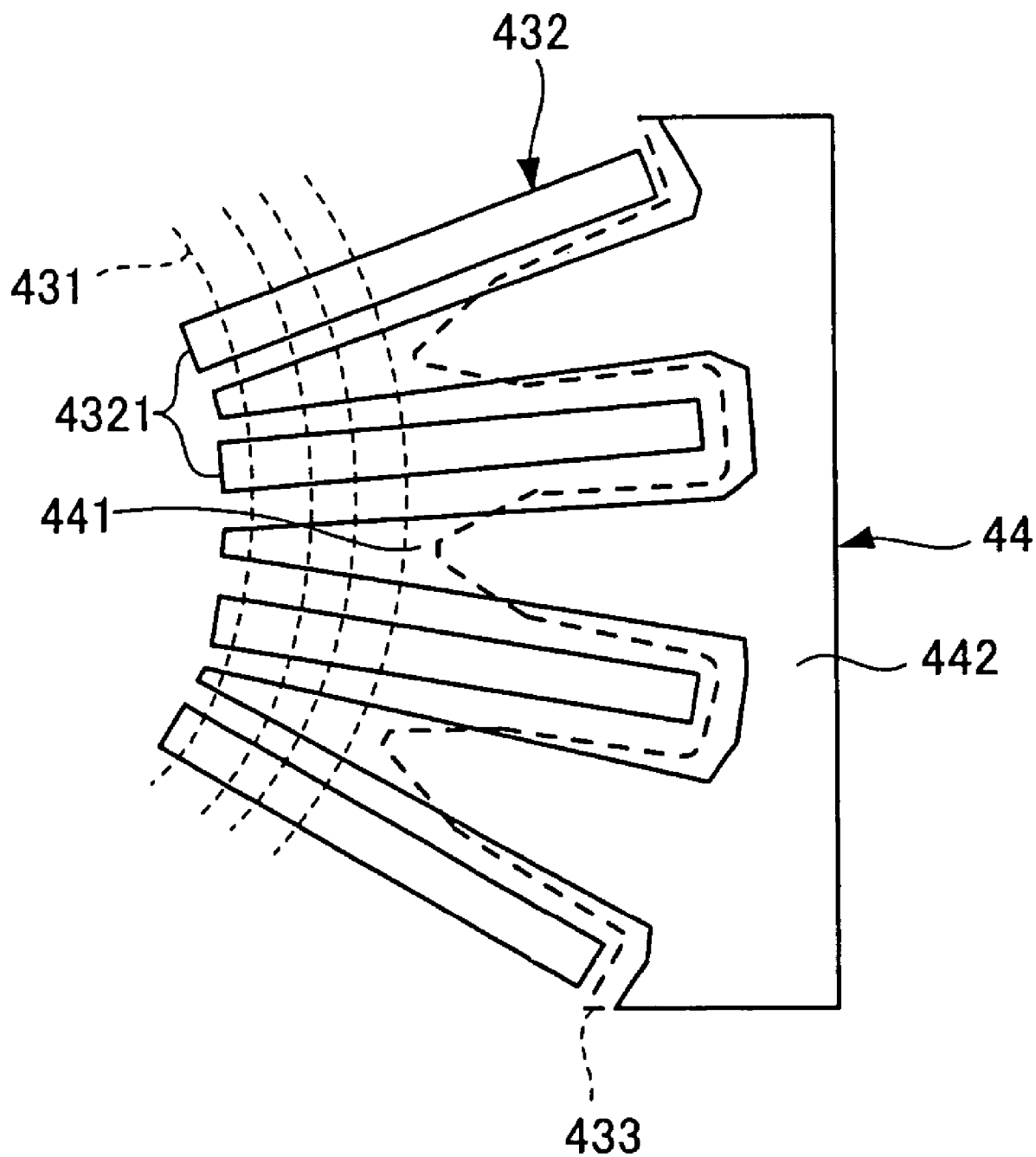
FIG. 12 is a diagram of the dielectric layer in which a heat transfer member is arranged between adjacent strips, as viewed from a glass substrate.

FIG. 12 is a diagram of the dielectric layer in which the heat transfer member is installed between the adjacent strips, as viewed from the glass substrate.

In FIG. 12, since the dielectric layer is viewed from the glass substrate, the yoke 432 is shown closer to the reader. The coil 431 and radiator 433, located behind the yoke 432, are shown by dotted lines. FIG. 12 also shown a heat transfer member 44. The heat transfer member 44 shown in FIG. 12 is a metal film made of copper. The heat transfer film 44 has extending portions 441 extending between the adjacent strips 4321 so as to overlap the corresponding projecting portion 4331 of the radiator 433 and the coil 431, and a peripheral portion 442 that connects the adjacent extending portions 441 together via the strips 4321. As described above, copper has a thermal conductivity of about 400 [W/mK], which is much larger than that of alumina, constituting the dielectric layer. The permalloy or CoNiFe allow, constituting the yoke 432 has a thermal conductivity of about 80 to 100 [W/mK]. Accordingly, the heat transfer member 44 transfers heat more easily than the yoke 432. Therefore, the heat generated by the coil 431 passes through the extending portions 441 of the heat transfer member 44 and finally reaches the radiator 433. The heat generated by the coil 431 is thus efficiently radiated. The heat transfer member 44 is copper and is thus a non-magnetic substance. Accordingly, the magnetic flux generated by the coil 431 is not concentrated on the heat transfer member 44. Thus, compared to the yoke 432, which is magnetic substance, only a small amount of eddy current is generated even in a part of the extending portion 441 which overlaps the coil 431.

Then, description will be given of a second embodiment of the magnetic field generator according to the present invention which is employed in place of the magnetic field generator 40, shown in FIG. 9.

Figure 13:
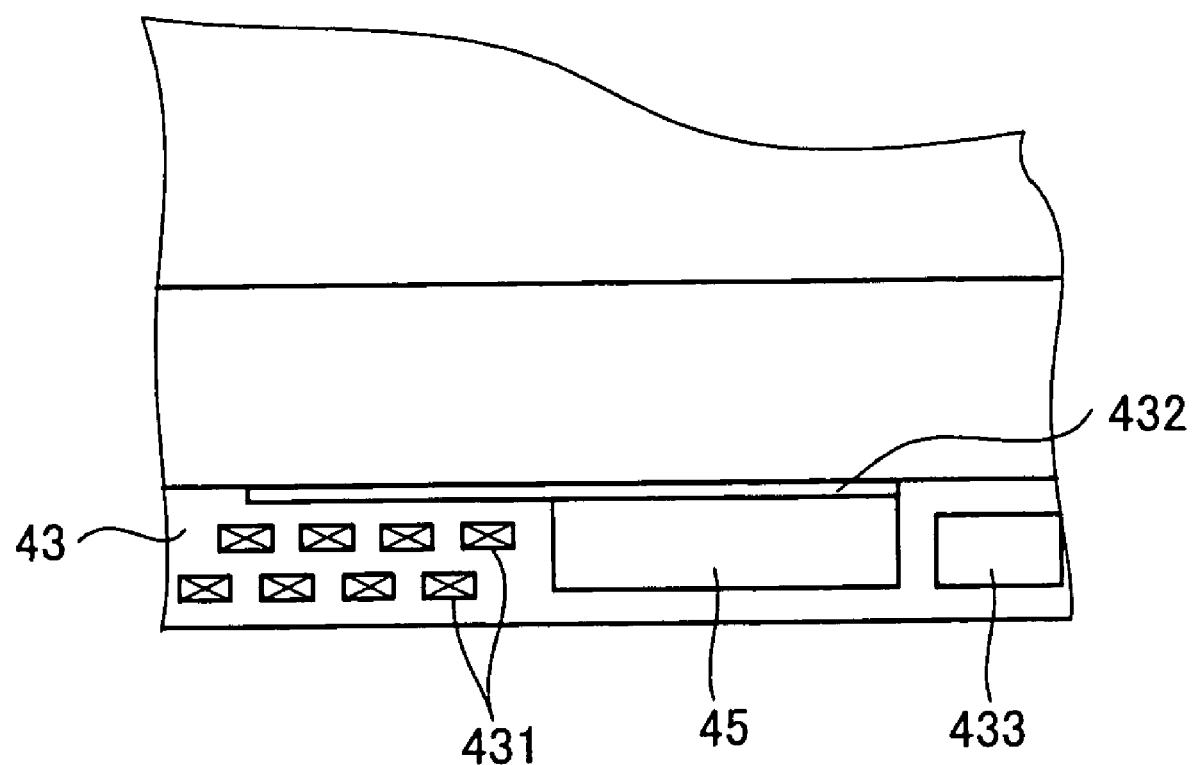
FIG. 13 is a sectional view schematically showing the structure of a part of a magnetic field generator according to a second embodiment.
Figure 14:
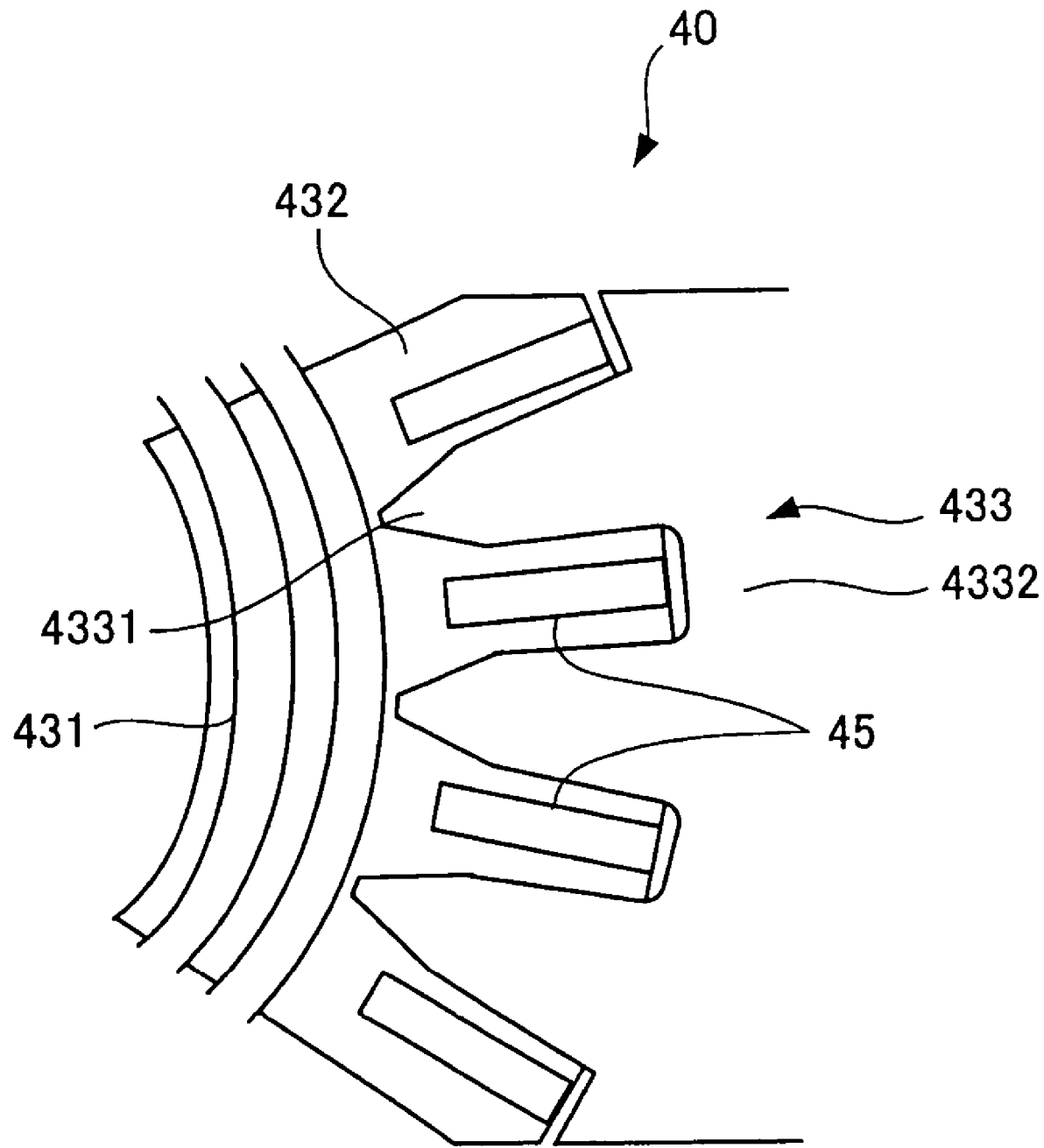
FIG. 14 is a schematic diagram showing the internal structure of the dielectric layer and in which the magnetic field generator shown in FIG. 13 is viewed from the MO disk.

FIG. 13 is a sectional view schematically showing the structure of a part of the magnetic field generator according to the second embodiment. FIG. 14 is a schematic diagram showing the internal structure of the dielectric layer and in which the magnetic field generator is viewed from the MO disk.

The same components as those described above will also be denoted by the same reference numerals. Duplicate descriptions will be omitted and only the characteristic points will be described.

A characteristic point of the magnetic field generator 40, shown in FIG. 13, is that a magnetic member 45 is installed in the recess of each groove portion 4332 of the radiator 433. As shown in FIG. 14, the magnetic member 45 is installed in the same plane of the dielectric layer 43 as that in which the coil 431 is provided. The magnetic member 45 is a plate piece having a higher volume resistivity than the radiator 433. Further, the yoke 432 shown in FIG. 13 is a donut-like soft magnetic film surrounding the transmission area through which laser light passes. The yoke 432 does not contact with the projecting portions 4331 of the radiator 433. Although there is a dielectric material between the yoke 432 and each projecting portion 4331, the yoke 432 is in contact with the magnetic member 45 as shown in FIG. 14. In the magnetic field generator 40, shown in FIG. 13, the magnetic member 45 attracts a magnetic flux generated around a current flowing though the coil 431. This reduces the amount of magnetic flux passing through the projecting portions 4331. Thus, although the tip of each projecting portion 4331, shown in FIG. 13, extends closer to the coil 431 than the tip of each of the projecting portions shown in FIG. 11, the amount of eddy current generated at the projecting portion 4331, shown in FIG. 13, is only equal to that generated at the tip of the projecting portion shown in FIG. 11. On the other hand, in view of the radiation efficiency, since the tip of the projecting portion 4331 of the radiator 433 is closer to the coil 431, the efficiency of radiation carried out by the projecting portions 4331 is improved. However, since the magnetic member 45 is made of a permalloy or CoNiFe alloy similarly to the yoke 432, it has a lower thermal conductivity than the radiator 433, made of copper. In this case, the projecting portions 4331 and the magnetic members 45 are alternately arranged around the coil 431. Accordingly, the projecting portions 4331 contribute to radiating heat generated by the coil 431, and the magnetic members 45 contribute to reducing the amount of eddy current generated. Further, an eddy current is likely to be generated in the magnetic members 45. However, since the eddy current decreases in inverse proportion to the volume resistivity in accordance with the Ohm's law (the amount of eddy current=induced electromotive force/resistance value) and the magnetic members 45 have a higher volume resistivity than the radiator 433, a smaller amount of eddy current is generated in the magnetic members 45 than in the projecting portions shown in FIG. 11. Consequently, the decrease in the efficiency of generation of magnetic fields is suppressed.

The embodiments of the present invention have been described. In each of the above embodiments, the radiator 433 formed of copper is placed close to the coil 431 to allow heat to be more efficiently radiated from the coil 431. Furthermore, it is possible to reduce the amount of eddy current generated inside the radiator 433. This makes it possible to reduce the attenuation of magnetic fields caused by an eddy current.

The invention claimed is:
1. A magnetic field generator comprising:
a coil extending spirally in a plane and covered with a dielectric material;
a magnetic substance provided parallel with the plane so as to overlap the coil; and a radiator extending in the plane so as to surround the coil and having projecting portions which project to an outermost periphery of the coil and groove portions which are recessed in a direction opposite to the direction in which the projecting portions project, the projecting portions and the groove portions being alternately arranged, the radiator having a higher thermal conductivity than the magnetic substance, and wherein the magnetic substance extends parallel with the plane to a corresponding position between the projecting portions while avoiding overlapping the projecting portions.

2. The magnetic field generator according to claim 1, wherein the coil extends spirally so as to surround a specified area of the plane, and the magnetic substance includes a plurality of strips extending radially around an area overlapping the specified area.

3. The magnetic field generator according to claim 2, comprising non-magnetic substances each installed between the adjacent strips and extending so as to overlap the projecting portions and coil, the non-magnetic substances having a higher thermal conductivity than the dielectric material.

4. The magnetic field generator according to claim 1, comprising magnetic members installed in recesses of the groove portions and covered with a dielectric material, the magnetic members having a higher volume resistivity than the radiator.

5. The magnetic field generator according to claim 1, wherein the projecting portions each have a width decreasing toward the outermost periphery of the coil.

* * * * *